(12) United States Patent
McBrien et al.

(10) Patent No.: US 6,449,080 B1
(45) Date of Patent: Sep. 10, 2002

(54) ELECTRO-OPTIC MODULATOR WITH ENHANCED BIAS STABILITY

(75) Inventors: Gregory J. McBrien, Cromwell; Thomas Joseph Gryk, Windham; Karl M. Kissa, Simsbury; Ed Wooten, Windsor; Russell Fuerst, East Windsor, all of CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/520,874

(22) Filed: Mar. 8, 2000

(51) Int. Cl.[7] .............................. G02F 1/03; G02F 1/035
(52) U.S. Cl. ........................... 359/245; 359/322; 385/2; 385/3; 385/8
(58) Field of Search .................... 385/1, 2, 3, 4, 385/8, 9, 14, 15, 16, 24, 27, 31, 39, 40, 41, 130, 131, 132; 333/33, 26, 206, 243, 244, 245; 359/245, 322, 305

(56) References Cited

U.S. PATENT DOCUMENTS

| | | |
|---|---|---|
| 5,138,480 A | 8/1992 | Dolfi et al. |
| 5,787,211 A | 7/1998 | Gopalakrishnan |
| 6,198,855 B1 * | 3/2001 | Hallemeier et al. ............ 385/2 |

FOREIGN PATENT DOCUMENTS

| | | |
|---|---|---|
| EP | 0 669 546 A2 | 8/1995 |
| JP | 4-268531 | 9/1992 |
| JP | 5-333296 | 12/1993 |
| JP | 11-237593 | 8/1999 |
| WO | WO 96/36901 | 11/1996 |

OTHER PUBLICATIONS

P. Jiang, "LiNbO$_3$ Mach–Zehnder Modulators with Fixed Negative Chirp" *IEEE Phontonics Tech. Letters* 8(10):1319–1321 (1996).

* cited by examiner

*Primary Examiner*—Huy Mai
*Assistant Examiner*—Tuyen Tra
(74) *Attorney, Agent, or Firm*—Kurt Rauschenbach; Rauschenbach Patent Law Group

(57) ABSTRACT

A co-planar waveguide interferometric electro-optic modulator that reduces the bias point sensitivity of the modulator to ambient temperature and to applied RF is described. The modulator includes a first and second waveguide that are formed in an electro-optic substrate. A RF electrode is positioned on the electro-optic substrate between the first and the second waveguide. A ground electrode that may include a slot is positioned proximate to the second waveguide. A guard ground electrode is positioned proximate to the first waveguide to sink heat from the RF electrode and may also balance the thermal stress in the two waveguides. A dielectric material may also be positioned proximate to the first waveguide to balance the thermal stress in the two waveguides.

40 Claims, 13 Drawing Sheets

ELECTRO-OPTIC MODULATOR WITH ENHANCED BIAS STABILITY

FIELD OF THE INVENTION

The present invention relates to improvements in electro-optic modulators. In particular, the present invention relates to methods and apparatus for reducing bias point sensitivity to ambient temperature and applied RF in an electro-optic modulator.

BACKGROUND OF THE INVENTION

Electro-optic modulators are typically biased with a DC voltage to set the quiescent phase difference between the two optical paths and to establish the operating point on the intensity-voltage curve about which modulation is induced. The bias point of electro-optic modulators is a function of the ambient temperature and the applied RF. As the ambient temperature and the applied RF changes, the desired bias point changes. The sensitivity of the bias point to ambient temperature and to applied RF can cause an increase in the bit error rate in digital communication systems.

FIG. 1 illustrates a schematic diagram of a prior art asymmetric co-planar waveguide (ACPW) Mach-Zehnder Interferometric (MZI) modulator indicating the field lines and thermal stress from the corners of the electrodes. Asymmetric RF electrodes are used to produce chirped optical signals. The modulator 100 includes an electro-optic substrate 102 with two waveguides 104, 104' diffused in the substrate 102. Crystal axes for x-cut lithium niobate are shown. A buffer layer 106 is formed on top of the substrate 102 and the two waveguides 104, 104'. An asymmetric co-planar waveguide (ACPW) electrode structure 108 is formed on top of the buffer layer 106. The electrode structure 108 includes a ground electrode 110 and a RF electrode 112.

Electric field lines 114 are illustrated for the electrode structure 108. The path of the electric field lines to waveguide 104 is significantly longer than the path of the electric field lines to waveguide 104'. Therefore, the modulation experienced by waveguide 104 is significantly weaker than the modulation experienced by waveguide 104'. The imbalance in modulation generates chirp, which can be desirable for some communication systems.

Asymmetric co-planar waveguide modulators have particularly strong bias point sensitivity to temperature. The bias point sensitivity results from a mismatch in thermal-expansion coefficients between the metal forming the electrodes, which is typically gold, and the electro-optic substrate, which is typically lithium niobate. The mismatch results in thermal stress 116 in the substrate 102 that is localized near the bottom corners of the electrodes as illustrated in FIG. 1. This "thermal stress" is a mechanical stress that is a function of temperature. The thermal stress 116 generates a piezoelectric voltage that is experienced by waveguide 104'.

The relatively wide ground electrode 110 causes significantly more thermal stress than the RF electrode 112 because it has a larger amount of strain accumulated across the width of the electrode and, therefore, generates a higher piezoelectric voltage compared with the RF electrode 112. The difference in the piezoelectric voltages experienced by waveguides results in a significant phase change that shifts the bias point of the modulator 100 as ambient temperature is increased.

Asymmetric co-planar waveguide modulators also have bias point sensitivity to the applied RF because of the "skin-effect." The RF electrode 112 is significantly smaller in cross section than the ground electrode 110, and therefore introduces more RF attenuation than the ground electrode 110. The lost RF energy is dissipated as heat, which causes a rise in temperature in the waveguides. Since the ground electrode 110 is a more effective heat sink than the RF electrode 112, a temperature differential may be created between the waveguides 104, 104'. The temperature differential shifts the bias point because the waveguides 104, 104' experience different magnitudes of thermal stress and because the optical refractive index of the substrate 102 changes as a function of temperature.

Some prior art electro-optic modulator designs use electrode structures that reduce bias point sensitivity to the applied RF signal. For example, "LiNbO$_3$ Mach-Zehnder Modulators with Fixed Negative Chirp," IEEE Photonics Technology Letters, Vol. 8, October 1996, pp. 1319–1321, describes various designs for x-cut lithium niobate chirped-modulator that reduce bias point sensitivity to the applied RF signal. Two of these prior art designs are illustrated below in FIG. 2 and FIG. 3.

FIG. 2 illustrates a schematic diagram of a prior art three electrode co-planar-waveguide Mach-Zehnder Interferometric modulator 130 having asymmetric gaps 132 that introduce chirp, yet reduce bias sensitivity to applied RF. The modulator 130 includes an electro-optic substrate 102 with two waveguides 104, 104' diffused in the substrate 102. Crystal axes for x-cut lithium niobate are shown. A buffer layer 106 is formed on top of the substrate 102 and the two waveguides 104, 104'. Two ground electrodes 110 are formed on top of the buffer layer 106. A RF electrode 112 is formed on top of the buffer layer and it is asymmetrically positioned between the two ground electrodes 110.

FIG. 3 illustrates a schematic diagram of a prior art three electrode co-planar-waveguide Mach-Zehnder Interferometric modulator 140 having asymmetric waveguide locations that introduce chirp, yet reduce bias sensitivity to applied RF. The modulator 140 includes an electro-optic substrate 102 with two waveguides 104, 104' diffused in the substrate 102. Crystal axes for x-cut lithium niobate are shown. A buffer layer 106 is formed on top of the substrate 102 and the two waveguides 104, 104'. Two ground electrodes 110 are formed on top of the buffer layer 106 so that they are asymmetrically positioned relative to the waveguides 104, 104'. A RF electrode 112 is formed on top of the buffer layer and it is symmetrically positioned between the two ground electrodes 110.

Although some prior art electrode structures for electro-optic modulator reduce the bias point sensitivity to applied RF, they do not reduce the bias point sensitivity to ambient temperature. This is because they do not relieve or compensate for stresses caused by thermal expansion resulting from changes in the ambient temperature.

SUMMARY OF THE INVENTION

The present invention relates to electro-optic modulators with reduced bias point sensitivity to ambient temperature and to applied RF. The modulators may be chirped or zero-chirp modulators. The invention is particularly useful for electro-optic modulators that have asymmetric co-planar waveguide electrode structures, which have relatively strong bias point sensitivity to ambient temperature and applied RF.

An electro-optic modulator of the present invention reduces the bias point sensitivity to ambient temperature and to applied RF by reducing the net phase shift caused by changes in the ambient temperature and by the applied RF field. Specifically, in one embodiment, an electro-optic modulator according to the present invention reduces the net phase shift by reducing the piezoelectric voltage experienced by one of the waveguides relative to the other waveguide. In another embodiment, an electro-optic modulator according to the present invention reduces the net phase shift by substantially matching the thermal stresses experienced by the waveguides and thus by causing the piezoelectric voltage experienced by one waveguide to be similar the piezoelectric voltage experienced by the other waveguide.

A discovery of the present invention is that bias point sensitivity in electro-optic modulators to both ambient temperature and to applied RF can be reduced by positioning the waveguides relative to the electrodes so that the thermal expansion proximate to one waveguide is similar to the thermal expansion proximate to the other waveguide. In one embodiment, an electro-optic modulator of the present invention reduces the net phase shift by positioning one waveguide proximate to the edge of the ground electrode.

Another discovery of the present invention is that net phase shift in an electro-optic modulator can be reduced by using an electrode structure that reduces the thermal stress. In one embodiment, an electro-optic modulator of the present invention includes a ground electrode that comprises thermal stress-relieving slots that reduce the generated piezoelectric voltage. In another embodiment, an electro-optic modulator of the present invention includes a ground electrode that has a relatively narrow-width.

Another discovery of the present invention is that net phase shift in an electro-optic modulator can be reduced by using a thermal stress compensation structure. In one embodiment, an electro-optic modulator of the present invention includes an in-line bias electrode that has a thermal sensitivity, which is opposite to the thermal sensitivity of the RF electrodes. In another embodiment, an electro-optic modulator of the present invention includes an asymmetric bias electrode with one wide ground electrode to provide a temperature sensitivity that is opposite in sign to that of the RF electrode. In another embodiment, an electro-optic modulator of the present invention includes a dielectric material that substantially matches thermal stress experienced by the two waveguides.

Accordingly, the present invention features a co-planar waveguide interferometric electro-optic modulator that may be a chirped modulator. The modulator includes a first and second waveguide that are formed in an electro-optic substrate. A RF electrode is positioned on the electro-optic substrate between the first and the second waveguide. In one embodiment, the RF electrode is asymmetrically positioned between the first and the second waveguide. A ground electrode is positioned proximate to the second waveguide. In one embodiment, the ground electrode includes at least one slot that reduces strain accumulated across the width of the ground electrode.

A width of the ground electrode relative to a width of the RF electrode is dimensioned to reduce a net phase shift of the modulator as a function of ambient temperature and, therefore, reduces the bias point sensitivity of the modulator to ambient temperature. In one embodiment, the width of the ground electrode is substantially less than ten times the width of the RF electrode.

In one embodiment, the modulator includes a dielectric material that is positioned proximate to the first waveguide and that causes a thermal stress that reduces the bias point sensitivity of the modulator to ambient temperature. In another embodiment, the modulator includes an electrode that is positioned proximate to the first waveguide that creates a thermal stress in the first waveguide that substantially matches an electrode-induced thermal stress in the second waveguide.

The present invention features another co-planar waveguide interferometric electro-optic modulator that includes a guard ground electrode that sinks heat from the RF electrode. The modulator may be a chirped modulator. The modulator includes a first and second waveguide that are formed in an electro-optic substrate. A RF electrode is positioned on the electro-optic substrate between the first and the second waveguide. In one embodiment, the RF electrode is asymmetrically positioned between the first and the second waveguide. A ground electrode is positioned proximate to the second waveguide.

A guard ground electrode is positioned proximate to the first waveguide. The guard ground electrode sinks heat that is generated by the RF electrode and, therefore, reduces the bias point sensitivity of the modulator to applied RF. In one embodiment, at least one of the ground electrode or the guard ground electrode includes at least one slot that reduces strain accumulated across the width of the ground electrode. In one embodiment, the modulator includes a dielectric material that is positioned proximate to the first waveguide and that causes a thermal stress that reduces the bias point sensitivity of the modulator to ambient temperature.

The present invention features another co-planar waveguide interferometric electro-optic modulator that includes a guard ground electrode that sink heat from the RF electrode and that also balances the thermal stress in the two waveguides. The modulator may be a chirped modulator. The modulator includes a first and second waveguide that are formed in an electro-optic substrate. A RF electrode is positioned on the electro-optic substrate between the first and the second waveguide. In one embodiment, the RF electrode is asymmetrically positioned between the first and the second waveguide. A ground electrode is positioned proximate to the second waveguide. In one embodiment, the ground electrode includes at least one slot that reduces strain accumulated across a width of the electrode.

A guard ground electrode is positioned proximate to the first waveguide. The guard ground electrode sinks heat that is generated by the RF electrode and, therefore, reduces the bias point sensitivity of the modulator to applied RF. The guard ground also causes the first waveguide to experience a thermal stress similar to the thermal stress experienced by the second waveguide and, therefore, reduces the bias point sensitivity of the modulator to ambient temperature. In one embodiment, at least one of the ground electrode or the guard ground electrode includes at least one slot that reduces strain accumulated across the width of the ground electrode.

In one embodiment, the guard ground electrode is positioned to cause the first waveguide to experience a thermal stress that substantially matches a thermal stress experienced by the second waveguide. In another embodiment, the guard ground electrode is dimensioned to cause the first waveguide to experience a thermal stress that substantially matches a thermal stress experienced by the second waveguide.

The present invention features another co-planar waveguide interferometric electro-optic modulator that includes a dielectric material to balance thermal stress in the two waveguides. The modulator may be a chirped modulator. The modulator includes a first and second waveguide that are formed in an electro-optic substrate. A RF electrode is positioned on the electro-optic substrate between the first and the second waveguide. In one embodiment, the RF electrode is asymmetrically positioned between the first and the second waveguide. A ground electrode is positioned proximate to the second waveguide.

A dielectric material is positioned proximate to the first waveguide. The dielectric material causes the first waveguide to experience a thermal stress that is similar to the thermal stress experienced by the second waveguide and, therefore, reduces the bias point sensitivity of the modulator to ambient temperature. In one embodiment, the dielectric material is positioned to cause the first waveguide to experience a thermal stress that substantially matches a thermal stress experienced by the second waveguide. In another embodiment, the dielectric material is dimensioned to cause the first waveguide to experience a thermal stress that substantially matches a thermal stress experienced by the second waveguide.

The present invention features an asymmetric co-planar waveguide Mach Zehnder interferometric electro-optic modulator that may be a chirped modulator. The modulator includes a first and second waveguide that are formed in a lithium niobate substrate. AN RF electrode is asymmetrically positioned on the lithium niobate substrate between the first and the second waveguide. A ground electrode is positioned proximate to the second waveguide. In one embodiment, the ground electrode has a width that is less than ten times a width of the RF electrode.

A guard ground electrode is positioned proximate to the first waveguide. The guard ground electrode sinks heat that is generated by the RF electrode and also causes the first waveguide to experience a thermal stress similar to the thermal stress experienced by the second waveguide. The modulator, therefore, reduces bias point sensitivity of the modulator to both ambient temperature and to applied RF.

The present invention also features a co-planar waveguide interferometric electro-optic modulator that includes a bias electrode modulator section. The bias electrode modulator section includes a first and second waveguide that are formed in an electro-optic substrate. A bias electrode is positioned on the electro-optic substrate between the first and the second waveguide. A first and second ground electrode are positioned on the electro-optic substrate proximate to the first and second waveguide, respectively. In one embodiment, at least one of the bias electrode, first electrode, and second electrode are positioned directly on the substrate. The bias electrode modulator section has a thermal sensitivity that is opposite to a thermal sensitivity of an RF electrode of the electro-optic modulator and, therefore, reduces the bias point sensitivity of the electro-optic modulator to ambient temperature.

BRIEF DESCRIPTION OF THE DRAWINGS

This invention is described with particularity in the appended claims. The above and further advantages of this invention may be better understood by referring to the following description taken in conjunction with the accompanying drawings, in which:

DETAILED DESCRIPTION

Figure 4:
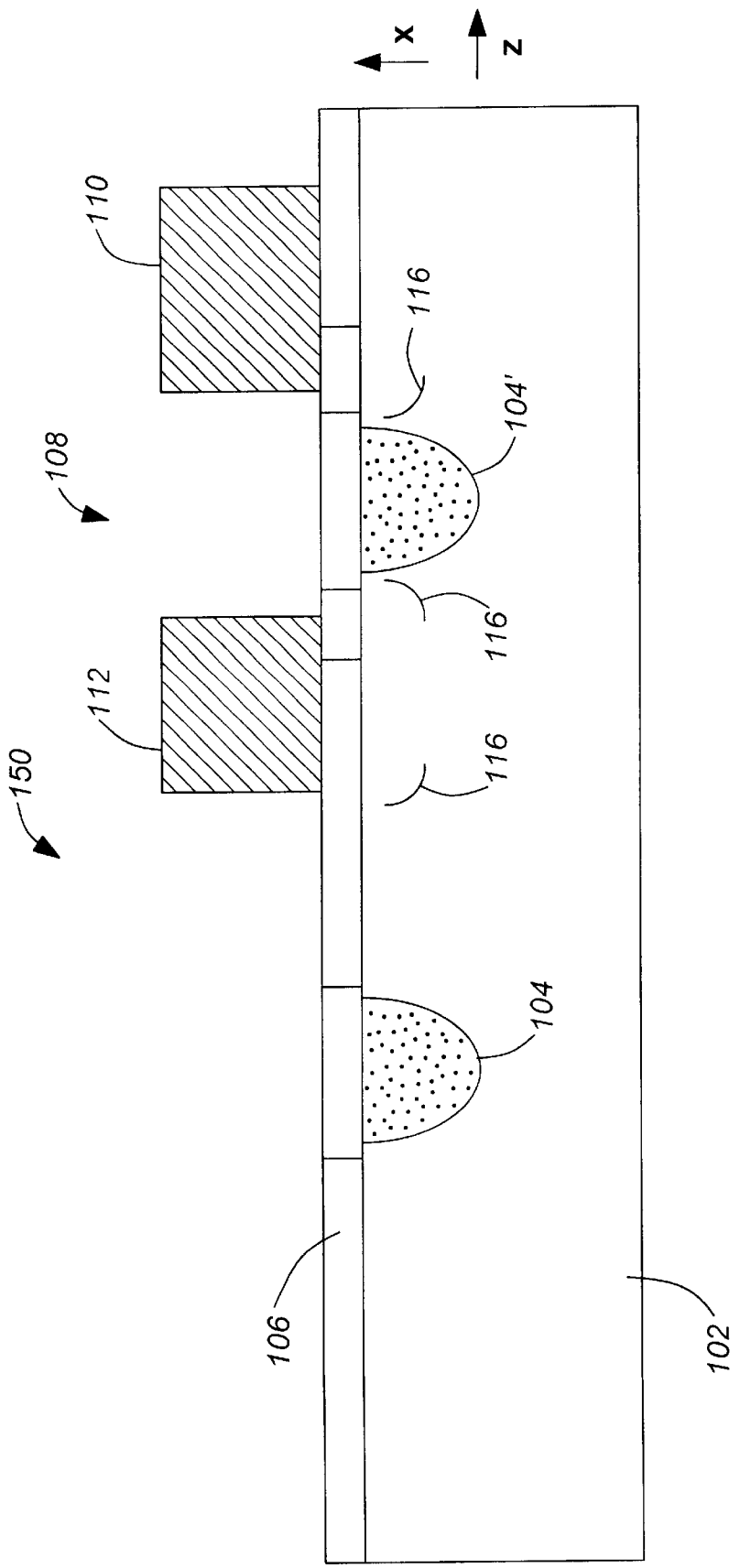
FIG. 4 illustrates a schematic diagram of a two-electrode asymmetric co-planar waveguide Mach-Zehnder Interferometric (MZI) modulator having a relatively narrow ground electrode that reduces thermal stress and thus reduces bias point sensitivity to ambient temperature.

Referring more particularly to the figures, like numerals indicate like structural elements and features in various figures. FIG. 4 illustrates a schematic diagram of a two-electrode asymmetric co-planar waveguide Mach-Zehnder Interferometric (MZI) modulator 150 having a relatively narrow ground electrode that reduces thermal stress and thus reduces bias point sensitivity to ambient temperature.

The modulator 150 includes an electro-optic substrate 102 with two waveguides 104, 104' diffused in the substrate 102. Crystal axes for x-cut lithium niobate are shown. A buffer layer 106 is formed on top of the substrate 102 and the two waveguides 104, 104'. An asymmetric co-planar waveguide (ACPW) electrode structure 108 is formed on top of the buffer layer 106. The electrode structure 108 includes a ground electrode 110 and a RF electrode 112.

Figure 1:
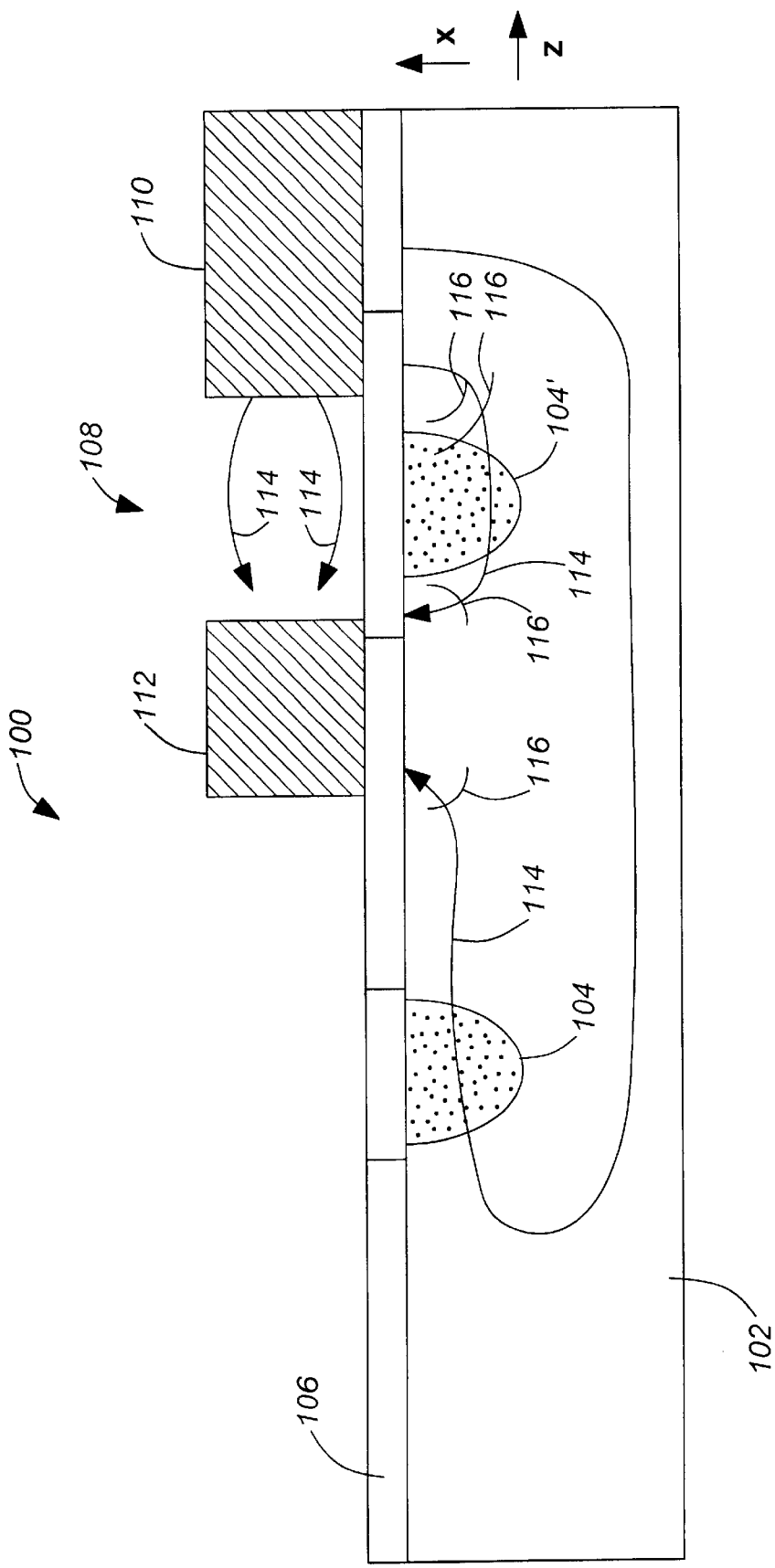
FIG. 1 illustrates a schematic diagram of a prior art asymmetric co-planar waveguide Mach-Zehnder Interferometric modulator indicating the field lines and thermal stress from the corners of the electrodes.
Figure 2:
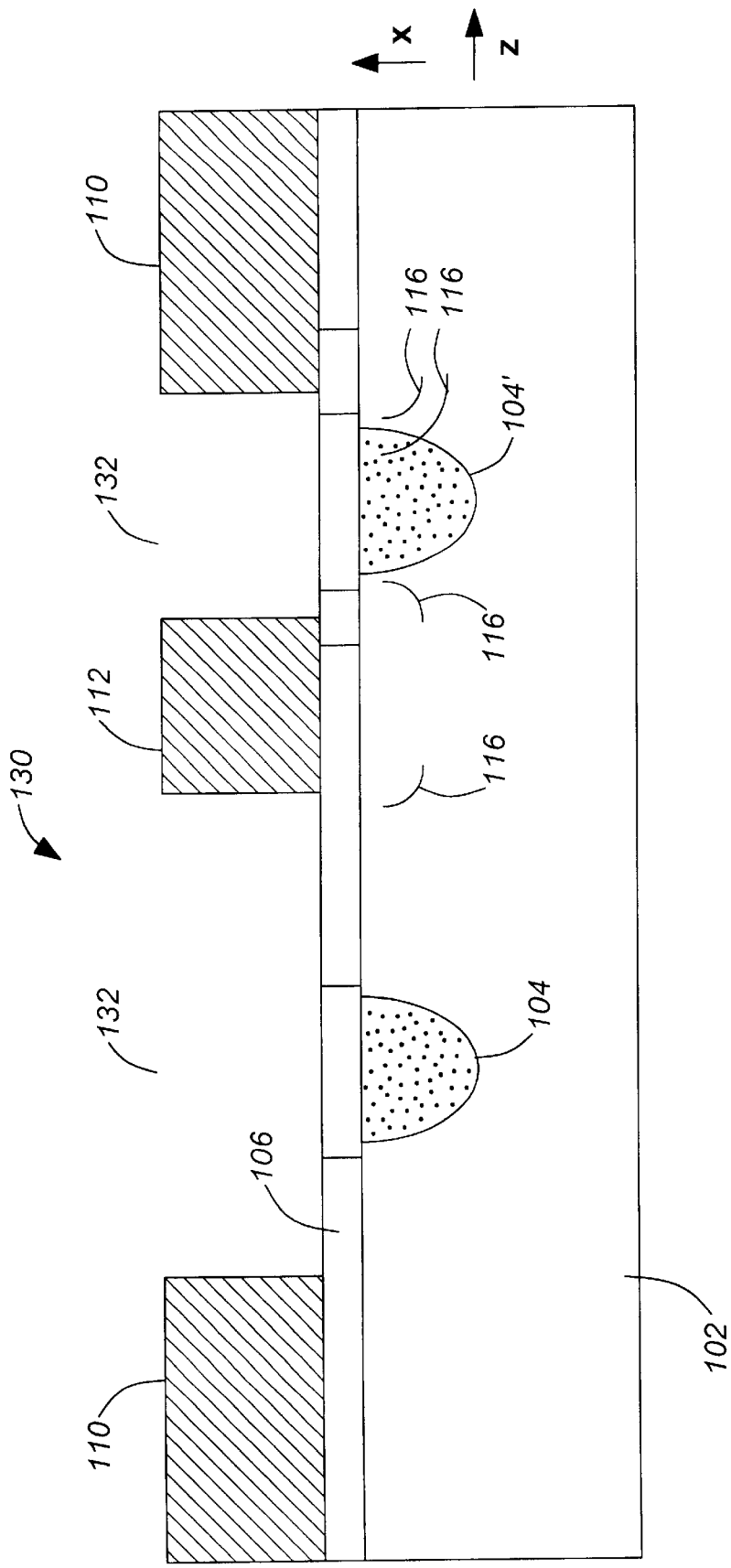
FIG. 2 illustrates a schematic diagram of a prior art three electrode co-planar-waveguide Mach-Zehnder Interferometric modulator having asymmetric gaps that introduce chirp, yet reduce bias sensitivity to applied RF.
Figure 3:
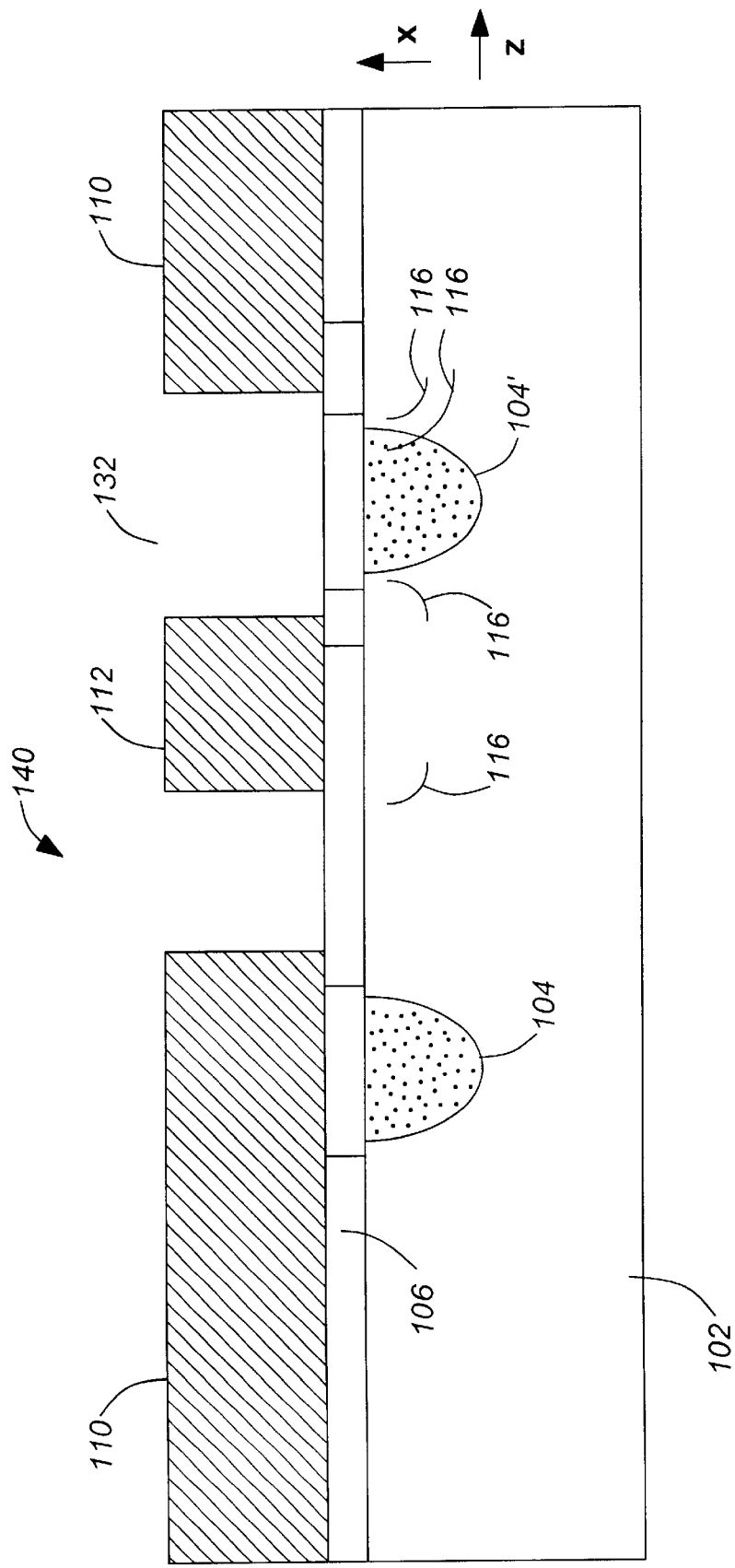
FIG. 3 illustrates a schematic diagram of a prior art three electrode co-planar-waveguide Mach-Zehnder Interferometric modulator having asymmetric waveguide locations that introduce chirp, yet reduce bias sensitivity to applied RF.

The width of the ground electrode 110 is relatively narrow compared with the width of prior art asymmetric co-planar waveguide MZI modulators and, therefore, there is less strain accumulated across the width of the ground electrode. In one embodiment, the ground electrode includes a slot that reduces strain accumulated across the width of the electrode. The relatively narrow ground electrode 110 generates a lower piezoelectric voltage proximate to waveguide 104' compared with the prior art two-electrode asymmetric co-planar waveguide MZI modulator 100 of FIG. 1. Therefore, the net phase shift in the electro-optic modulator and the resulting bias-point shift caused by changes in the ambient temperature are lower than the prior art modulator 100 of FIG. 1.

In one embodiment, the dimensions of the ground electrode are chosen so that the piezoelectric voltage experienced by waveguide 104' is reduced and thus the net phase shift and resulting bias point shift are reduced compared with the prior art. In another embodiment, the dimensions of the ground electrode are chosen so that the piezoelectric voltage experienced by waveguide 104' is similar to the piezoelectric voltage experienced by waveguide 104 and thus, the net phase shift and resulting bias point shift are substantially zero.

However, the ground electrode 110 cannot be too narrow because as the width of the ground electrode is reduced, the RF loss increases due to the smaller cross section of the conductor. The increase in the RF loss is dissipated as heat proximate to waveguide 104' and will, therefore, cause additional thermal stress proximate to waveguide 104'. The additional thermal stress will create a piezoelectric voltage and a resulting bias point shift as described above. The bias point also shifts because the dissipated heat causes a change in the refractive index of waveguide 104' relative to the refractive index of waveguide 104 because the refractive index of the electro-optic substrate is a strong function of temperature. In one embodiment, the ground electrode has a width that is substantially less than ten times a width of the RF electrode.

Figure 5:
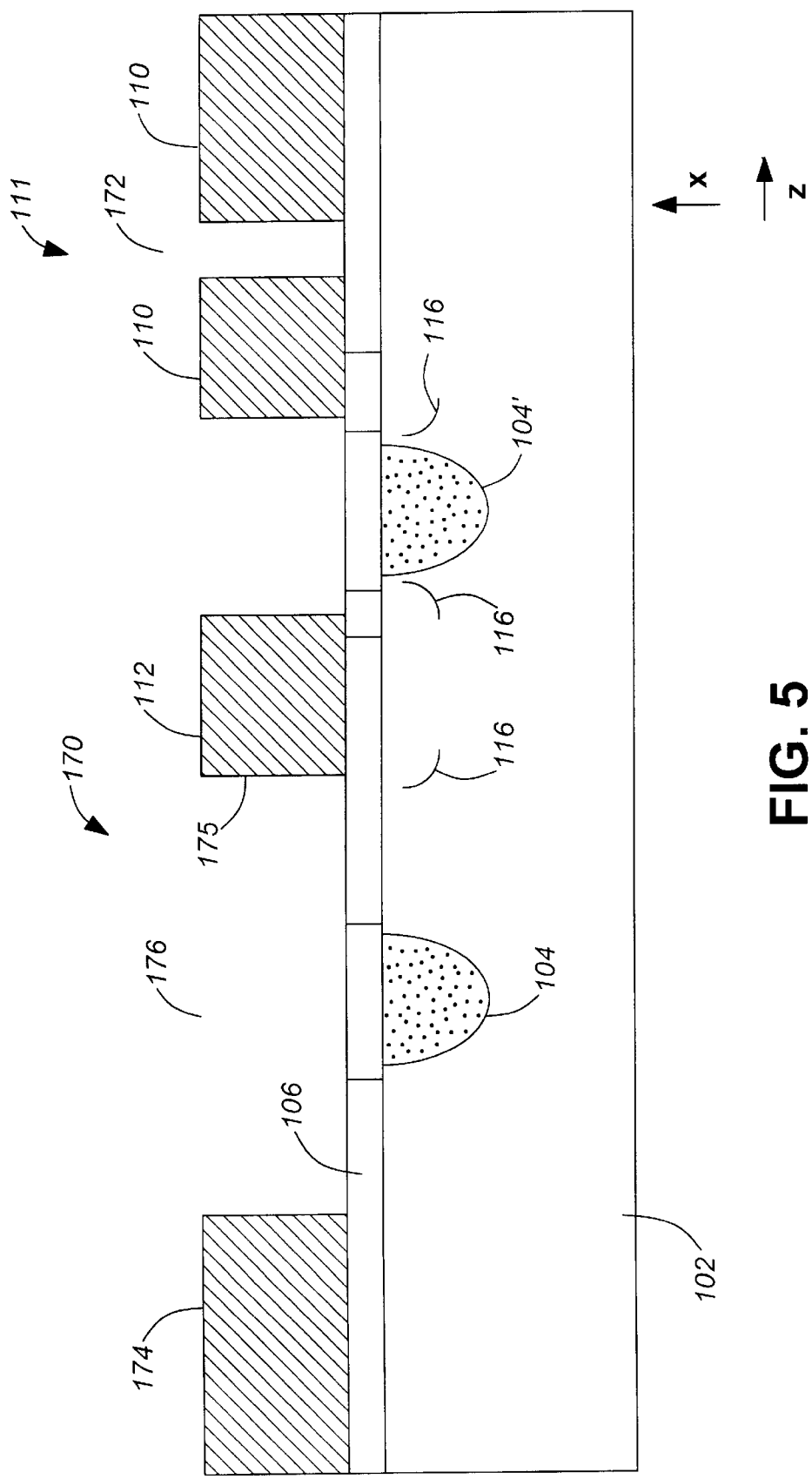
FIG. 5 illustrates a schematic diagram of a three electrode asymmetric co-planar waveguide Mach-Zehnder Interferometric modulator with a slotted ground and a guard ground that reduces bias point sensitivity to both ambient temperature and applied RF.

FIG. 5 illustrates a schematic diagram of a three electrode asymmetric co-planar waveguide Mach-Zehnder Interferometric (MZI) modulator 170 with a slotted ground and a guard ground that reduce bias point sensitivity to both ambient temperature and applied RF. The modulator 170 includes an electro-optic substrate 102 with two waveguides 104, 104' diffused in the substrate 102. Crystal axes for x-cut lithium niobate are shown. A buffer layer 106 is formed on top of the substrate 102 and the two waveguides 104, 104'.

An asymmetric two-electrode co-planar waveguide (ACPW) electrode structure 108 is formed on top of the buffer layer 106. The electrode structure 108 includes a slotted ground electrode 111 and a RF electrode 112. The slotted ground electrode 111 includes a ground electrode 110 having a slot 172 that reduces strain accumulated across the width of the ground electrode 110 and, therefore, reduces the piezoelectric voltage experienced by the waveguide 104'. In one embodiment of the invention, sections of the ground electrode 110 are electrically connected periodically along the length of the MZI. The periodic electrical connections suppress high-order waveguide modes, which might establish if the various ground electrode 110 sections developed different voltages.

In addition, the modulator 170 includes a guard ground 174 that is positioned adjacent to the waveguide 104 and the RF electrode 112. The guard ground 174 is a heat sink that removes heat from the first side 175 of the RF electrode, thereby reducing thermal stress and the temperature rise in the region and thus reducing the piezoelectric voltage and the refractive index change experienced by the waveguide 104. The gap 176 between guard ground 174 and the RF electrode 112 is typically large enough to prevent significant RF coupling between the guard ground 174 and the RF electrode 112. The net phase shift in the MZI caused by changes in the ambient temperature and by the applied RF field is significantly reduced.

Figure 6:
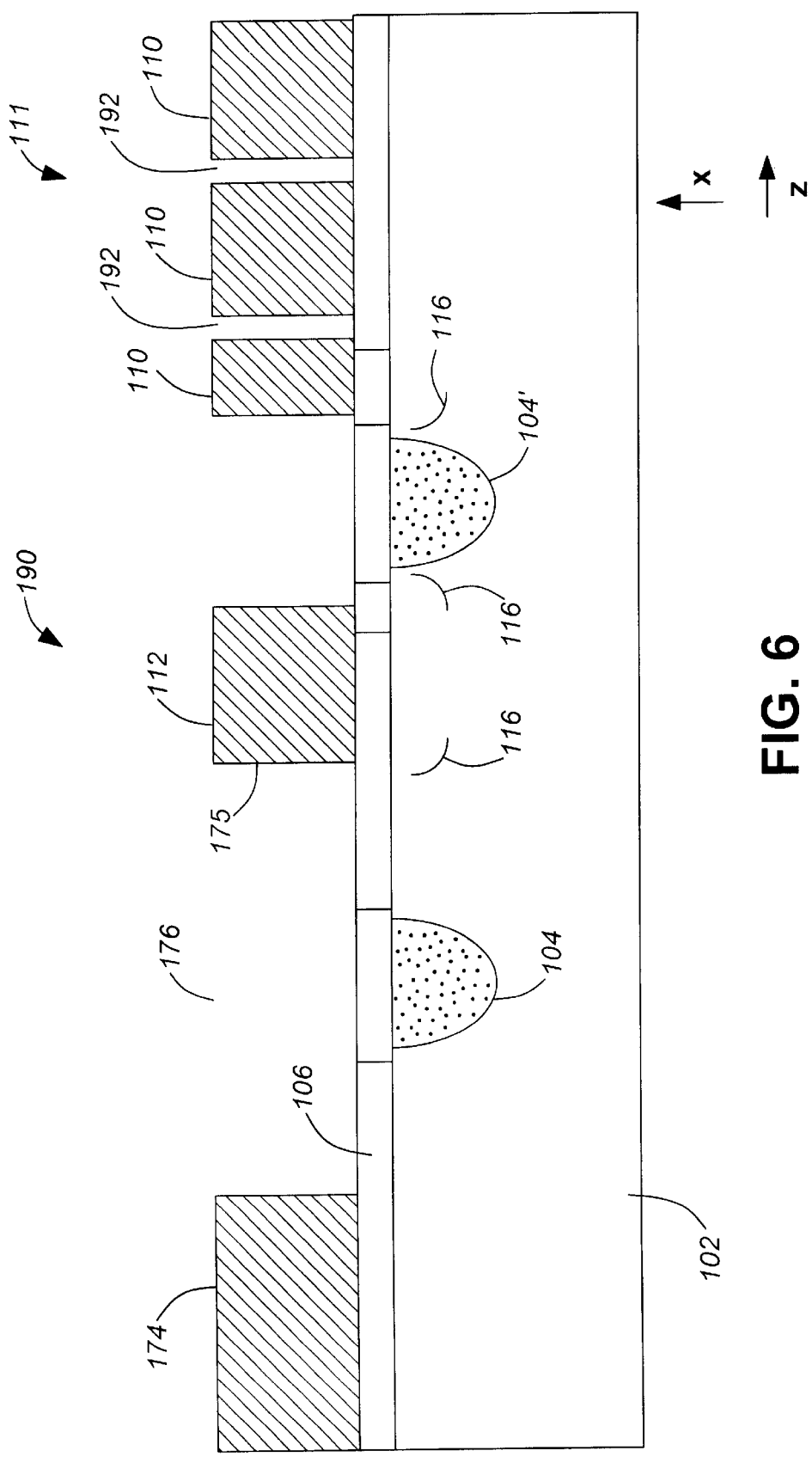
FIG. 6 illustrates a schematic diagram of a three electrode asymmetric co-planar waveguide Mach-Zehnder Interferometric modulator with a double-slotted ground and a guard ground that reduce bias point sensitivity to both ambient temperature and applied RF.

FIG. 6 illustrates a schematic diagram of a three electrode asymmetric co-planar waveguide Mach-Zehnder Interferometric (MZI) modulator 190 with a double-slotted ground and a guard ground that reduce bias point sensitivity to both ambient temperature and applied RF. The modulator 190 is similar to the modulator 170 of FIG. 5. However, the ground has a double slot 192. The double slot 192 further reduces strain accumulated across the width of the ground electrode 110 and, therefore, further reduces the piezoelectric voltage experienced by the waveguide 104'. The net phase shift in the MZI caused by changes in the ambient temperature and by the applied RF field is significantly reduced.

In one embodiment of the invention, sections of the double-slotted ground electrode 110 are electrically connected periodically along the length of the MZI. The periodic electrical connections suppress high order waveguide modes, which might establish if the various ground electrode 110 sections developed different voltages.

Figure 7:
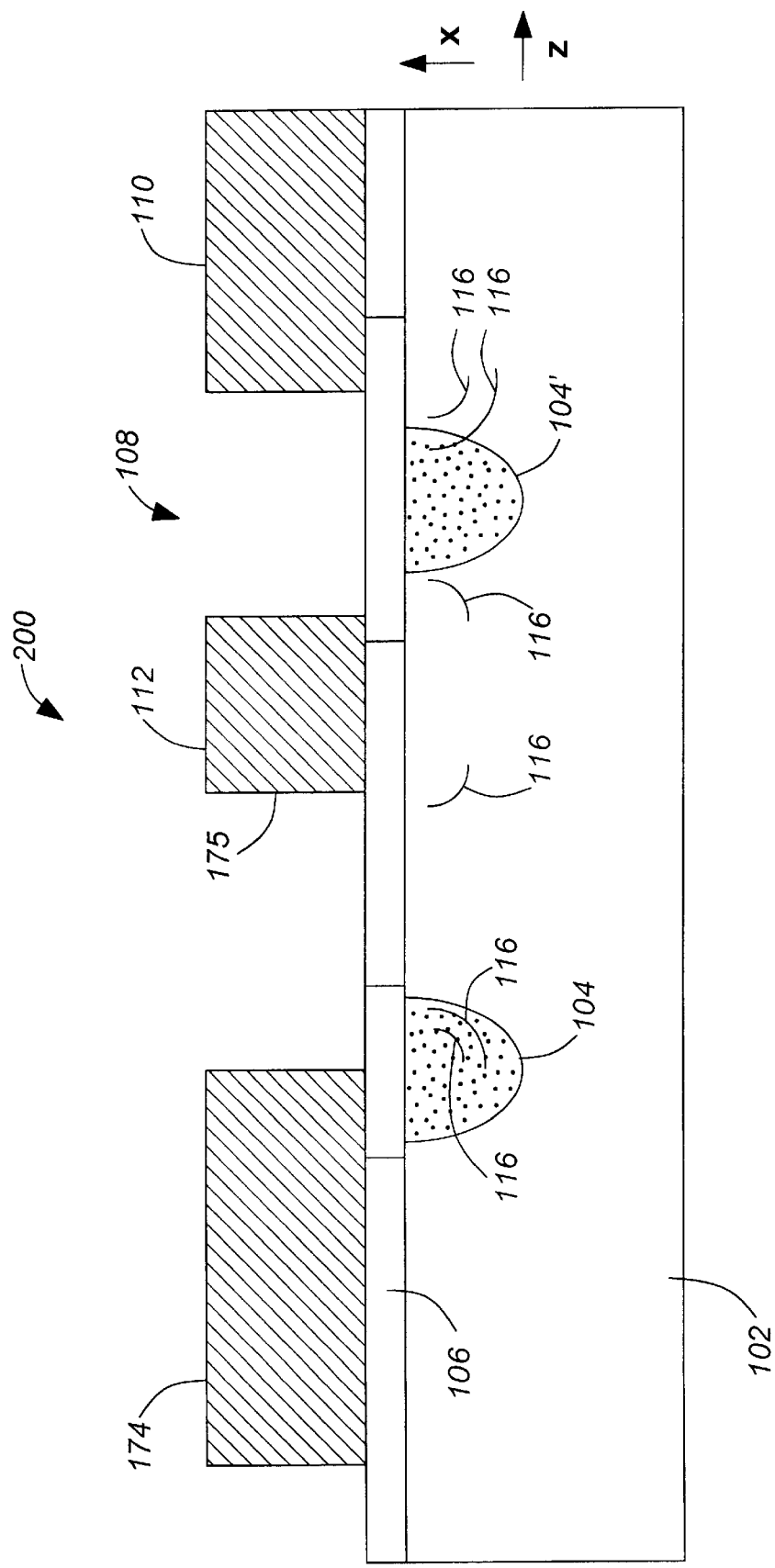
FIG. 7 illustrates a schematic diagram of a three-electrode asymmetric co-planar waveguide Mach-Zehnder Interferometric (MZI) modulator with a guard ground positioned in close proximity to a waveguide that reduces bias point sensitivity to both ambient temperature and applied RF.

FIG. 7 illustrates a schematic diagram of a three-electrode asymmetric co-planar waveguide Mach-Zehnder Interferometric (MZI) modulator 200 with a guard ground positioned in close proximity to a waveguide that reduces bias point sensitivity to both ambient temperature and applied RF. The modulator 200 includes an electro-optic substrate 102 with two waveguides 104, 104' diffused in the substrate 102. Crystal axes for x-cut lithium niobate are shown. A buffer layer 106 is formed on top of the substrate 102 and the two waveguides 104, 104'.

A two-electrode co-planar waveguide electrode structure 108 is formed on top of the buffer layer 106. The electrode structure 108 includes a ground electrode 110 and a RF electrode 112. A guard ground electrode 174 is positioned adjacent to the RF electrode 112 and in close proximity to waveguide 104. In one embodiment, the guard ground 174 is positioned directly over a portion of the waveguide 104.

The guard ground electrode 174 is a heat sink that removes heat from the first side 175 of the RF electrode 112. In one embodiment, the guard ground electrode 174 and the ground electrode 110 are at substantially the same potential. The guard ground electrode 174 and the ground electrode 110 may be wire bonded together to force the electrodes to be at substantially the same potential. This provides a path for the RF ground current resulting from their close proximity and thus suppresses the excitation of higher-order microwave modes.

The guard ground electrode 174 is positioned in close proximity to the waveguide 104 and, therefore, causes a thermal stress 116 on waveguide 104. The guard ground electrode 174 may partially overlap the waveguide 104 as illustrated in FIG. 7. In one embodiment of the invention, the guard ground electrode 174 is positioned such that the waveguide 104 experiences a thermal stress that is similar to the thermal stress experienced by waveguide 104' from both the RF electrode 112 and the ground electrode 110. Thus, the guard ground electrode 174 is positioned such that waveguide 104 experiences a piezoelectric voltage that substantially matches the piezoelectric voltage experienced by waveguide 104'. Therefore, in this embodiment, the net phase shift in the MZI caused by changes in the ambient temperature and by the applied RF field is significantly reduced or is substantially zero.

Figure 8:
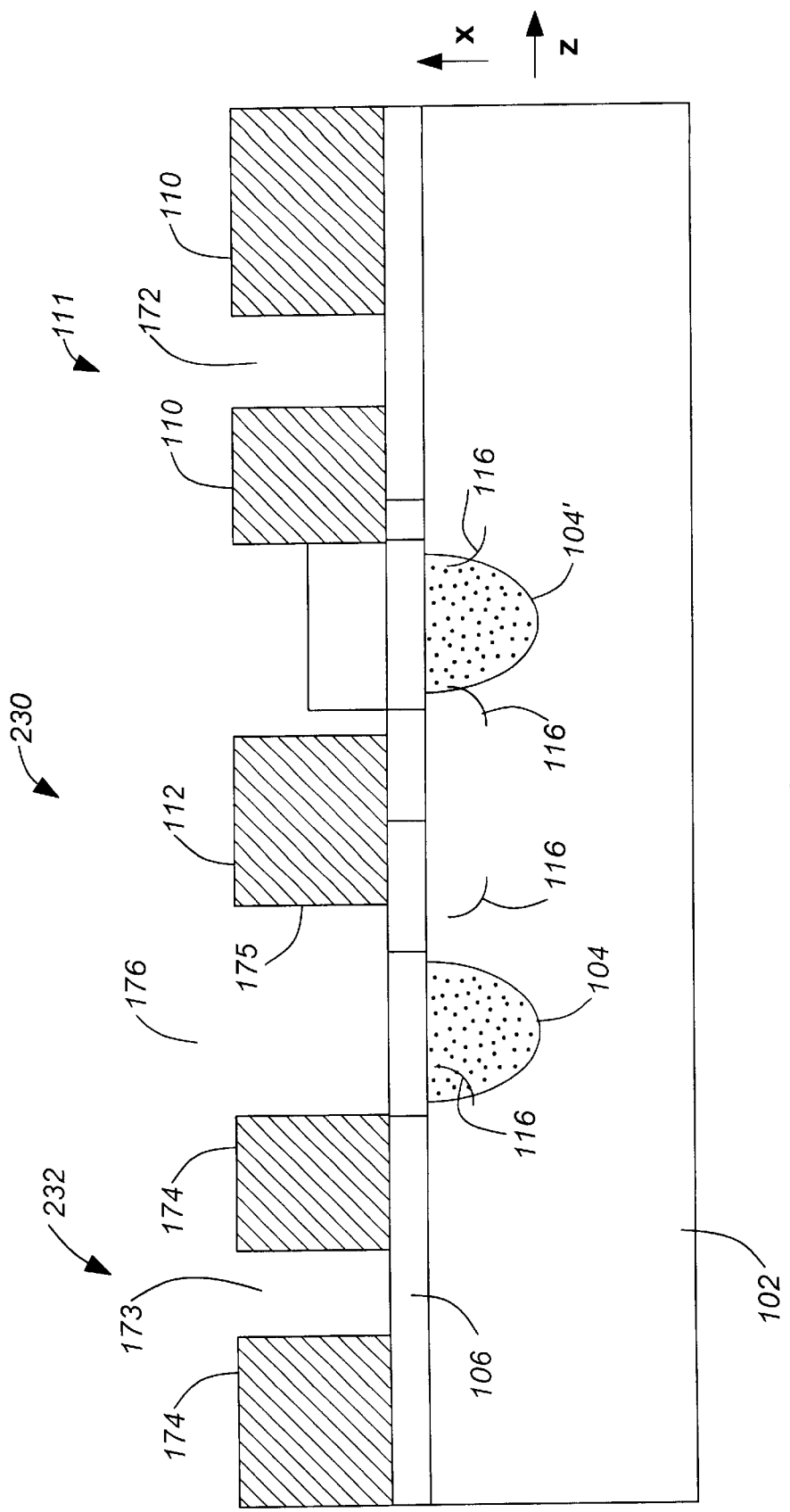
FIG. 8 illustrates a schematic diagram of a three-electrode asymmetric co-planar waveguide Mach-Zehnder Interferometric modulator with a slotted ground electrode and a slotted guard ground electro de that reduce bias point sensitivity to both ambient temperature and applied RF.

FIG. 8 illustrates a schematic diagram of a three-electrode asymmetric co-planar waveguide Mach-Zehnder Interferometric (MZI) modulator 230 with a slotted ground electrode and a slotted guard ground electrode that reduce bias point sensitivity to both ambient temperature and applied RF. The modulator 230 is similar to the modulator 170 of FIG. 5 that includes a slotted ground electrode and a guard ground electrode. However, the modulator 230 includes a slotted guard ground electrode that is positioned in close proximity to a waveguide.

The modulator 230 includes a slotted ground electrode 111 and a RF electrode 112. The ground electrode 110 includes a slot 172, which reduces thermal strain accumulated across the width of the round electrode 110 and, therefore, reduces the piezoelectric voltage experienced by the waveguide 104'. In one embodiment of the invention, sections of the slotted ground electrode 110 are electrically connected periodically along the length of the MZI. The periodic electrical connections suppress high-order waveguide modes, which might establish if the various ground electrode 110 sections developed different voltages.

In addition, the modulator 230 includes a slotted guard ground electrode 232 that includes a slot 173 and that is positioned adjacent to the RF electrode 112. The slotted guard ground electrode 232 is a heat sink that removes heat from the first side 175 of the RF electrode, thereby reducing thermal stress and temperature differential in the region and thus reducing the piezoelectric voltage and the refractive index change experienced by the waveguide 104.

Guard ground electrode 232 will typically draw some electric field lines from the RF electrode 112. In one embodiment, the slotted guard ground electrode 232 and the ground electrode 110 are at substantially the same potential. The slotted guard ground electrode 232 and the ground electrode 110 may be wire bonded together to force the electrodes to be at substantially the same potential. This will provide a path for the RF ground current resulting from their close proximity and thus suppress the excitation of higher-order microwave modes.

In one embodiment, the slotted guard ground electrode 232 is positioned proximate to the waveguide 104 so that it causes a thermal stress that substantially matches the total thermal stress experienced by waveguide 104' from both the RF electrode 112 and the ground electrode 110. Consequently, the piezoelectric voltage experienced by waveguide 104 due to the thermal stress caused by the slotted guard ground electrode 232 will be substantially equal to the piezoelectric voltage experienced by waveguide 104' due to the thermal stress caused by the RF electrode 112 and the ground electrode 110. Thus the net phase shift in the ME caused by changes in the ambient temperature and by the applied RF field is significantly reduced or is substantially zero.

Figure 9:
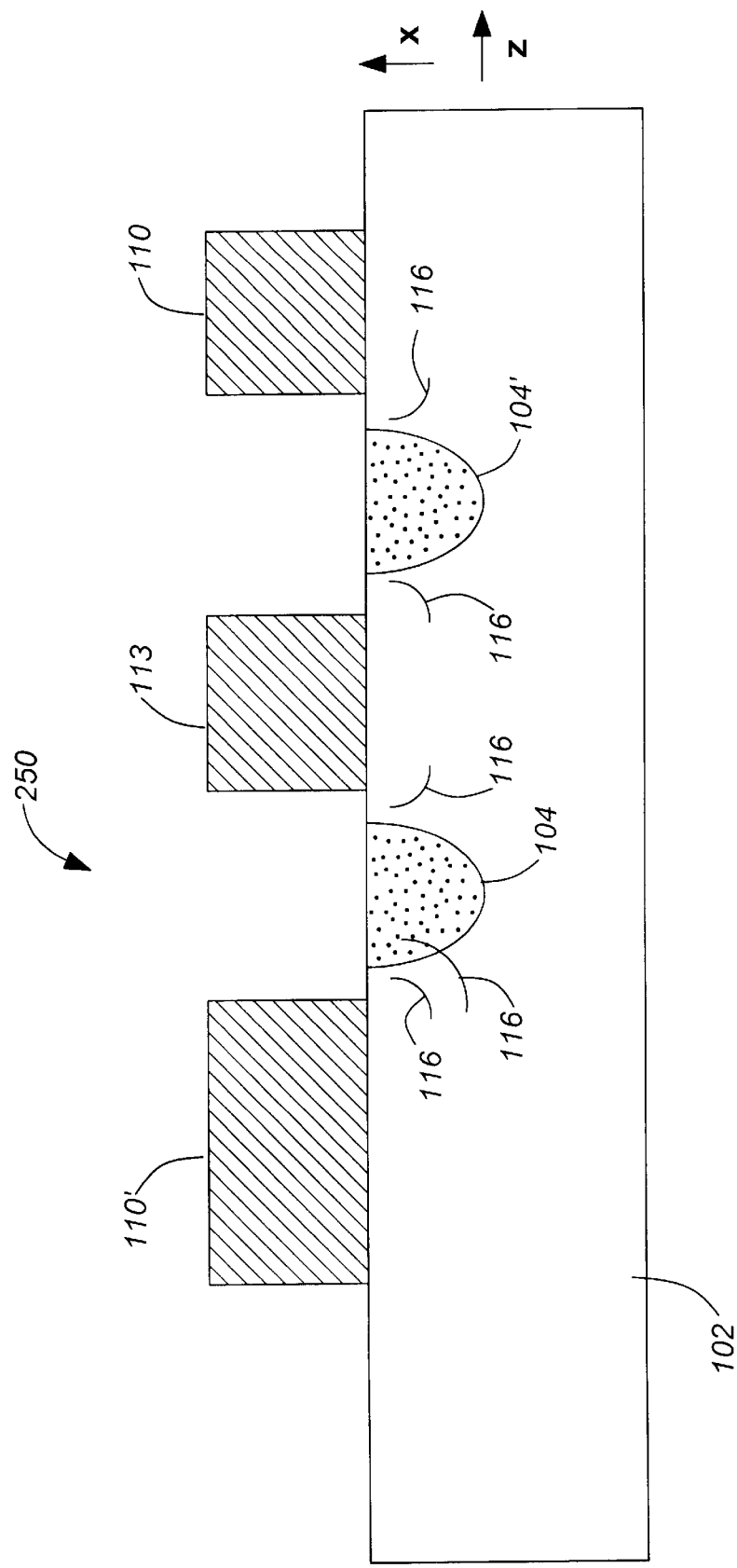
FIG. 9 illustrates a schematic diagram of an asymmetric in-series bias electrode modulator section 250 that may be positioned in series with the modulators of the previous figures, which reduces bias point sensitivity to ambient temperature.

FIG. 9 illustrates a schematic diagram of an asymmetric in-series bias electrode modulator section 250 that may be positioned in series with the modulators of the previous figures, which reduces bias point sensitivity to ambient temperature. The modulator section 250 includes an electro-optic substrate 102 with two waveguides 104, 104' diffused in the substrate 102. Crystal axes for x-cut lithium niobate are shown. The modulator section 250 does not have a buffer layer formed on top of the substrate 102 and the two waveguides 104, 104'. However, the preceding RF electrode section, as shown in the previous figures, typically includes a buffer layer A bias electrode 113 and two ground electrodes 110 and 110' are formed directly on top of the electro-optic substrate 102 without the use of a buffer layer. Because there is no buffer layer separating the electrodes from the electro-optic substrate 102, the thermal stress resulting from the mismatch in thermal-expansion coefficients between the electrodes and the electro-optic material 102 is relatively high. The ground electrode 110' that is proximate to waveguide 104 is substantially wider than the ground electrode 110 that is proximate to waveguide 104'. Consequently, the ground electrode 110' causes more thermal stress proximate to waveguide 104.

In one embodiment, the width of the ground electrode 110' is chosen so that the bias point thermal sensitivity introduced by the in-series bias electrode is equal in magnitude and opposite in sign to the thermal sensitivity introduced by the proceeding RF electrode. Therefore, the net phase shift caused by changes in the ambient temperature is significantly reduced or substantially zero.

Figure 10:
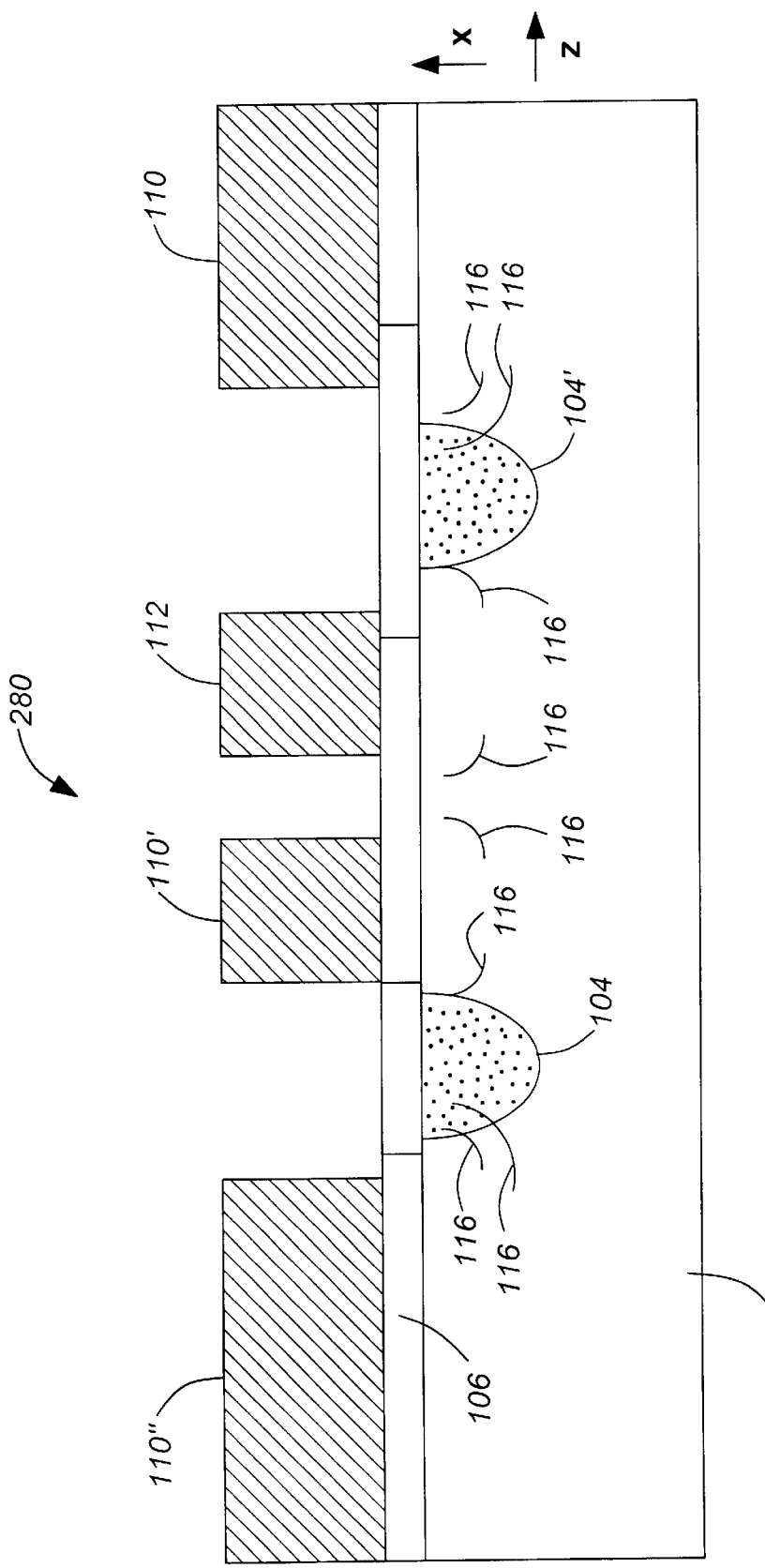
FIG. 10 illustrates a four-electrode co-planar waveguide Mach-Zehnder Interferometric (MZI) modulator that includes ground electrodes that substantially match the thermal stress experienced by the two waveguides in order to reduce bias point sensitivity to ambient temperature and to applied RF.

FIG. 10 illustrates a four-electrode co-planar waveguide Mach-Zehnder Interferometric (MZI) modulator 280 that includes ground electrodes that substantially match the thermal stress and temperature experienced by the two waveguides in order to reduce bias point sensitivity to ambient temperature and to applied RF. The modulator 280 includes an electro-optic substrate 102 with two waveguides 104, 104' diffused in the substrate 102. Crystal axes for x-cut lithium niobate are shown.

A RF electrode 112 is positioned adjacent to waveguide 104'. Three ground electrodes 110, 110', and 110" are positioned so that the thermal stress experienced by the two waveguides 104, 104' is similar or is substantially matched. The ground electrode 110' has substantially the same width as the RF electrode 112 and is positioned proximate to waveguide 104 to cause a thermal stress that substantially matches the thermal stress caused by the RF electrode 112 to waveguide 104'. Ground electrodes 110, 110" are positioned proximate to waveguides 104', 104 such that the thermal stress and temperature experienced by waveguides 104', 104 is substantially matched. Thus the net phase shift in the MZI caused by changes in the ambient temperature and by the applied RF field is minimized or is substantially zero.

In one embodiment, the ground electrodes 110', 110" are connected periodically along the length of the waveguide 104 (not shown) to keep the ground electrodes 110', 110" at substantially the same potential. The periodic connections may cause waveguide 104 to experience additional thermal stress. To compensate for the additional thermal stress, the position of the ground electrodes 110", 110' relative to the waveguide 104 can be adjusted.

Figure 11:
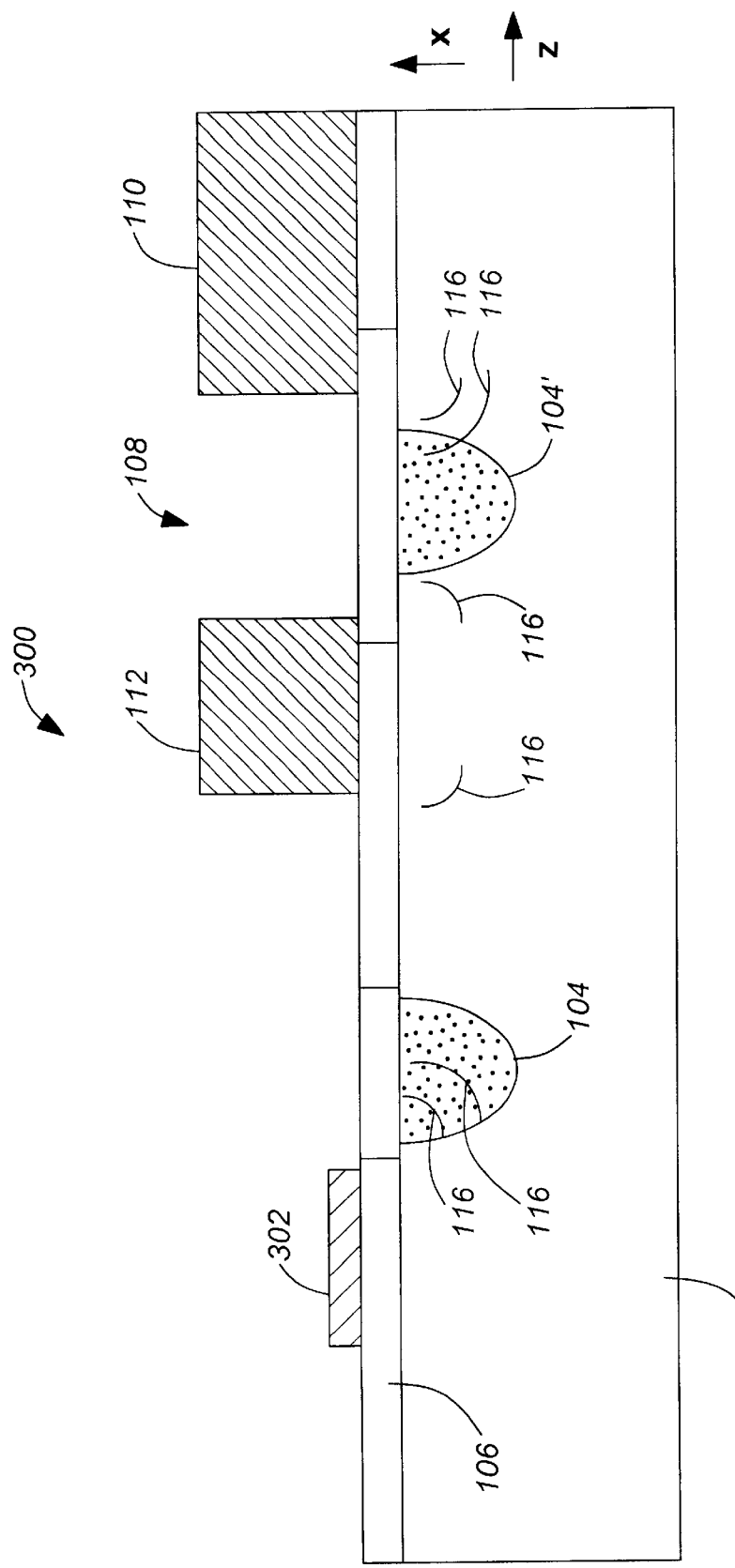
FIG. 11 illustrates an asymmetric co-planar waveguide Mach-Zehnder Interferometric (MZI) modulator that includes a dielectric material positioned proximate to one waveguide that substantially matches the thermal stress experienced by the two waveguides of the interferometric and, thus reduces bias point sensitivity to ambient temperature.

FIG. 11 illustrates an asymmetric co-planar waveguide Mach-Zehnder Interferometric (MZI) modulator 300 that includes a dielectric material positioned proximate to one waveguide that substantially matches the thermal stress experienced by the two waveguides of the interferometric and, thus reduces bias point sensitivity to ambient temperature. The modulator 300 includes an electro-optic substrate 102 with two waveguides 104, 104' diffused in the substrate 102. Crystal axes for x-cut lithium niobate are shown. An electrode structure 108 is formed on top of the buffer layer 106. The electrode structure 108 includes a ground electrode 110 and a RF electrode 112.

A dielectric material 302 is positioned proximate to waveguide 104 on top of the buffer layer 106. In another embodiment (not shown), the dielectric material 302 is positioned directly on the substrate 102. Numerous dielectric materials having different mechanical properties, such as thermal expansion coefficient and stiffness, are well known in the art and can be used with this embodiment of the invention. The dielectric material 302 and its position relative to the ground electrode 110 and the RF electrode 112 are chosen so that they do not significantly perturb RF performance. Dielectric material 302 may provide some heat sinking to reduce the temperature differential between waveguides 104, 104'.

In one embodiment, the type and dimensions of electrode material, type and dimensions of the dielectric material, and the position of the dielectric material relative to waveguide 104 are chosen so that the thermal stress experienced by the two waveguides 104, 104' is substantially matched. Consequently, the net phase shift in the MZI caused by changes in the ambient temperature and by the applied RF field is significantly reduced or is substantially zero. Numerous combinations of electrode metal and dimensions, dielectric material and dimensions, and relative positions can substantially match the thermal stress experienced by the two waveguides 104, 104'. One skilled in the art can determine these combinations from calculations and relatively simple experimentation.

For example, if the dielectric material 302 has a higher thermal expansion coefficient than the metallic material comprising the ground electrode 110 and RF electrode 112, which is typically gold, the height and/or width of the dielectric material 302 is reduced relative to the height and/width of the ground electrode 110 and RF electrode 112. Similarly, if the dielectric material 302 has a higher thermal expansion coefficient than the metallic material comprising the ground 110 and RF electrode 112, the distance between the dielectric material and the waveguide 104 is increased.

Figure 12:
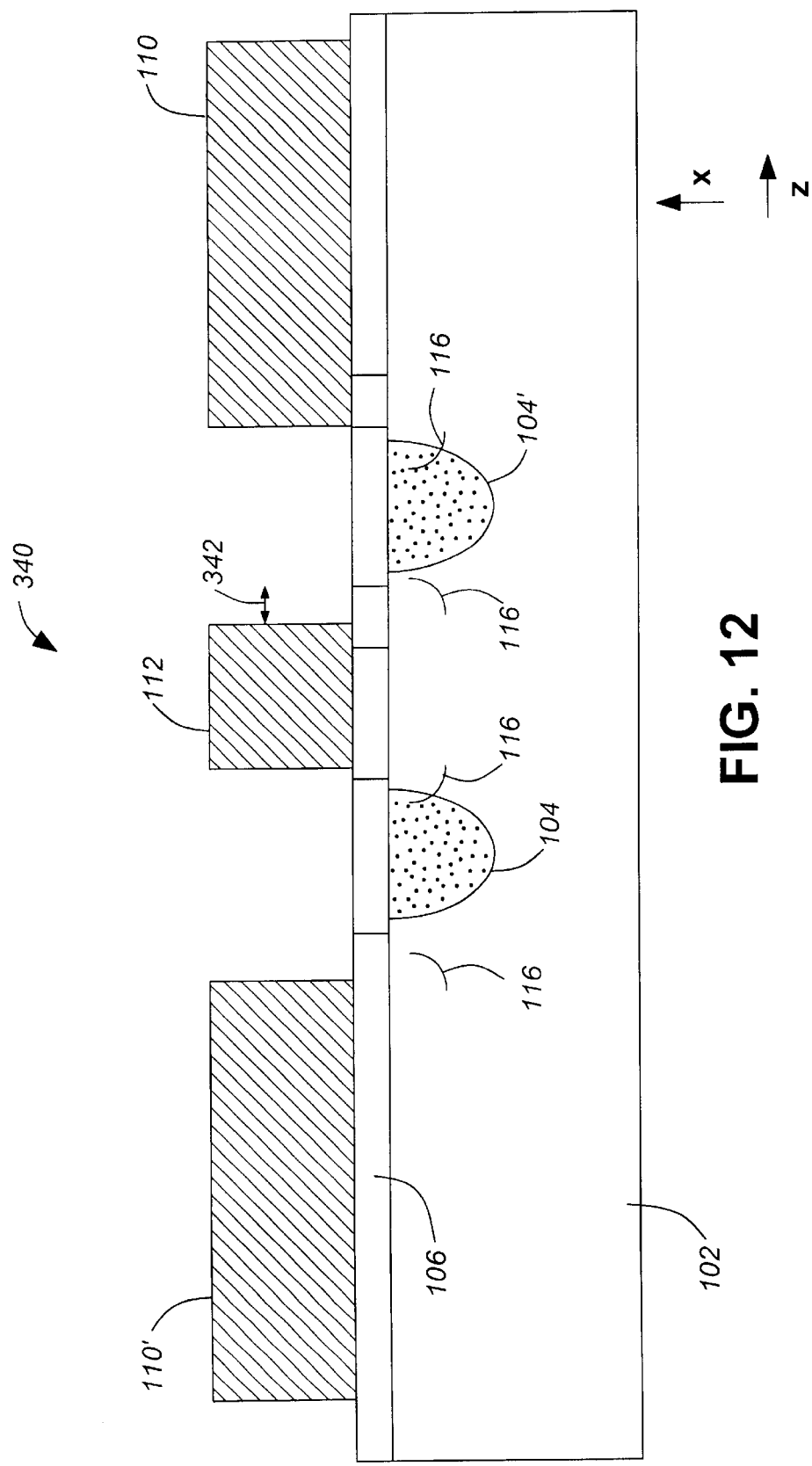
FIG. 12 illustrates a three-electrode co-planar waveguide Mach-Zehnder Interferometric (MZI) modulator that includes unintentionally mis-aligned waveguides that increase bias point sensitivity to ambient temperature and to applied RF.

FIG. 12 illustrates a three-electrode co-planar waveguide Mach-Zehnder Interferometric (MZI) modulator 340 that includes unintentionally mis-aligned waveguides that increase bias point sensitivity to ambient temperature and to applied RF. The modulator 340 includes an electro-optic substrate 102 with two waveguides 104, 104' diffused in the substrate 102. Crystal axes for x-cut lithium niobate are shown.

A three-electrode structure is formed on top of the buffer layer 106. The three-electrode structure includes two ground electrodes 110, 110' and a RF electrode 112. The three electrodes are mis-aligned relative to the waveguides 104, 104' an offset distance 342 so that ground electrode 110 is closer waveguide 104' than the ground electrode 110' is to waveguide 104. This mis-alignment may be the result of a device fabrication error.

Waveguide 104' experiences a thermal stress from ground electrode 110. Waveguide 104 experiences a thermal stress from ground electrode 110'. Because the waveguides 104, 104' are mis-aligned, waveguide 104 experiences less thermal stress from the ground electrode 110' than waveguide 104' experiences from ground electrode 110. Both waveguides 104, 104' experience thermal stress from RF electrode 112. Because the waveguides 104, 104' are mis-aligned, waveguide 104 experiences more thermal stress from RF electrode 112 than waveguide 104'. The thermal stress experienced by two waveguides 104, 104' may be different thereby causing a bias point shift.

Figure 13:
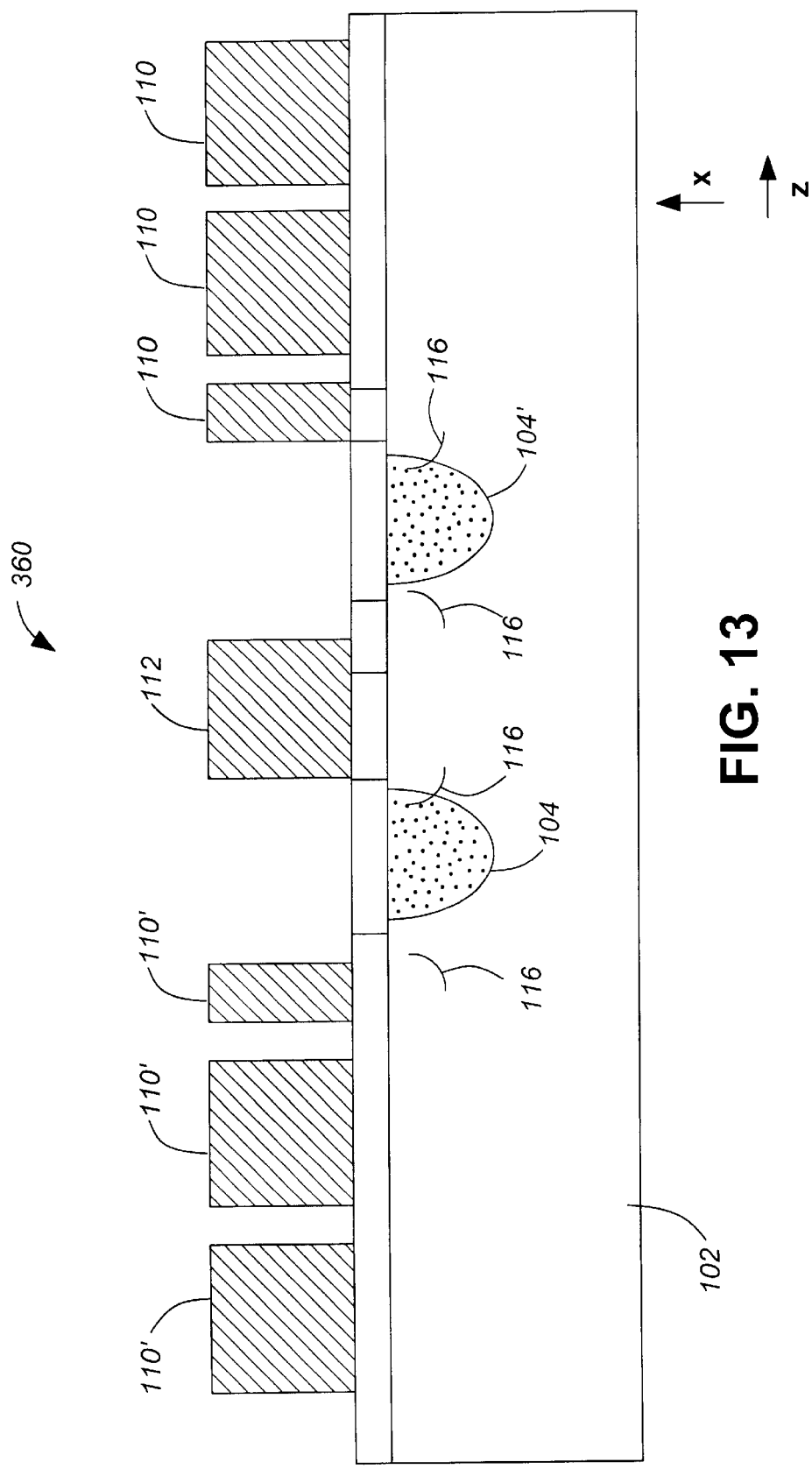
FIG. 13 illustrates a three-electrode co-planar waveguide Mach-Zehnder Interferometric (MZI) modulator that includes double-slotted ground electrodes that reduce bias point sensitivity to ambient temperature and to applied RF that results from the mis-aligned waveguides described in connection with FIG. 12.

FIG. 13 illustrates a three-electrode co-planar waveguide Mach-Zehnder Interferometric (MZI) modulator 360 that includes double-slotted ground electrodes that reduce bias point sensitivity to ambient temperature and to applied RF that results from the mis-aligned waveguides described in connection with FIG. 12. The modulator 360 is similar to the modulator 340 of FIG. 12 with the addition of doubled-slotted ground electrodes 110, 110', which were described in connection with FIG. 6.

The doubled-slotted ground electrodes 110, 110' reduce strain accumulated across the width of the ground electrodes 110, 110' and, therefore, reduce the piezoelectric voltage experienced by the waveguides 104, 104'. The doubled slotted ground electrodes 110, 110' also increase the common mode rejection of the thermal stress. In one embodiment of the invention, sections of the double-slotted ground electrodes 110, 110' are electrically connected periodically along the length of the MZI. The periodic electrical connections suppress high order waveguide modes, which might establish if the various sections of ground electrode developed different voltages.

One skilled in the art can appreciate that there are numerous other embodiments of the electro-optic modulator of the present invention that reduce the bias point sensitivity to ambient temperature and to applied RF by reducing and/or substantially matching thermal stress and temperature. There are numerous variations of thermal stress reducing and/or substantially matching electrode and dielectric structures. For example, the ground electrodes and guard grounds electrodes can have many different widths and can be slotted in many different ways. Also, there are numerous electrode and dielectric material geometries that substantially match the thermal stress experienced by the two waveguides.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A co-planar waveguide interferometric electro-optic modulator comprising:

a) a first and second waveguide that are formed in an electro-optic substrate;

b) a RF electrode having a width that is positioned on the electro-optic substrate between the first and the second waveguide; and c) a ground electrode having a width dimensioned relative to the width of the RF electrode to reduce a piezoelectric voltage caused by thermal stress experienced by the second waveguide, thereby reducing a net phase shift and a resulting bias point sensitivity of the modulator to ambient temperature, the ground electrode being positioned on the electro-optic substrate proximate to the second waveguide and comprising at least one slot for reducing strain accumulated across the width of the ground electrode.

2. The modulator of claim 1 wherein the width of the ground electrode is substantially less than ten times the width of the RF electrode.

3. The modulator of claim 1 further comprising a dielectric material that is positioned proximate to the first waveguide, the dielectric material causing the first waveguide to experience a thermal stress that substantially matches the thermal stress experienced by the second waveguide, thereby reducing the bias point sensitivity of the modulator to ambient temperature.

4. The modulator of claim 1 wherein the RF electrode is asymmetrically positioned on the electro-optic substrate between the first and the second waveguide.

5. The modulator of claim 1 further comprising an electrode that is positioned proximate to the first waveguide, wherein the electrode introduces a thermal stress into the first waveguide that substantially matches the thermal stress experienced by the second waveguide, thereby reducing the bias point sensitivity of the modulator to ambient temperature.

6. The modulator of claim 1 wherein the modulator is a chirped modulator.

7. The modulator of claim 1 wherein a buffer layer is positioned between the electro-optic substrate and at least one of the RF electrode and the ground electrode.

8. The modulator of claim 1 further comprising a guard ground electrode that is positioned on the electro-optic substrate proximate to the first waveguide.

9. The modulator of claim 1 further comprising an in-line bias electrode modulator section that has a thermal sensitivity that is opposite to a thermal sensitivity of the RF electrode.

10. A co-planar waveguide interferometric electro-optic modulator comprising:
   a) a first and second waveguide that are formed in an electro-optic substrate;
   b) a RF electrode having a width that is positioned on the electro-optic substrate between the first and the second waveguide;
   c) an in-line bias electrode modulator section that is positioned on the electro-optic substrate and has a thermal sensitivity that is opposite to a thermal sensitivity of the RF electrode; and
   d) a ground electrode having a width dimensioned relative to the width of the RF electrode to reduce a piezoelectric voltage caused by thermal stress experienced by the second waveguide, thereby reducing a net phase shift and resulting bias point sensitivity of the modulator to ambient temperature, the ground electrode being positioned on the electrode-optic substrate proximate to the second waveguide.

11. The modulator of claim 10 wherein a buffer layer is positioned between the electro-optic substrate and at least one of the RF electrode, the ground electrode, and the guard ground electrode.

12. The modulator of claim 10 wherein the ground electrode comprises at least one slot, the at least one slop reducing strain accumulated across the width of the ground electrode.

13. The modulator of claim 10 wherein the width of the ground electrode is substantially less than ten times the width of the RF electrode.

14. The modulator of claim 10 further comprising a dielectric material that is positioned proximate to the first waveguide, the dielectric material causing the first waveguide to experience a thermal stress that substantially matches the thermal stress experienced by the second waveguide, thereby reducing the bias point sensitivity of the modulator to ambient temperature.

15. The modulator of claim 10 wherein the RF electrode is asymmetrically positioned on the electro-optic substrate between the first and the second waveguide.

16. The modulator of claim 10 further comprising an electrode that is positioned proximate to the first waveguide, wherein the electrode introduces a thermal stress into the first waveguide that substantially matches the thermal stress experienced by the second waveguide, thereby reducing the bias point sensitivity of the modulator to ambient temperature.

17. The modulator of claim 10 wherein the modulator comprises a chirped modulator.

18. A co-planar waveguide interferometric electro-optic modulator comprising:
   a) a first and second waveguide that are formed in an electro-optic substrate;
   b) a RF electrode that is positioned on the electro-optic substrate between the first and the second waveguide;
   c) a ground electrode that is positioned on the electro-optic substrate proximate to the second waveguide, the ground electrode generating a thermal stress in the second waveguide; and
   d) a guard ground electrode that is dimensioned to sink heat from the RF electrode, the guard ground electrode generating a thermal stress in the first waveguide that substantially matches the thermal stress generated in the second waveguide, thereby reducing a net phase shift and a resulting bias point sensitivity of the modulator to both ambient temperature and an applied RF field, the guard ground electrode being positioned on the electro-optic substrate proximate to the first waveguide.

19. The modulator of claim 18 wherein a width of the guard ground electrode is dimensioned to cause the first waveguide to experience the thermal stress.

20. The modulator of claim 18 wherein a width of the guard ground electrode is dimensioned to cause the first waveguide to experience thermal stress that substantially matches a thermal stress experienced by the second waveguide.

21. The modulator of claim 18 wherein at least one of the ground electrode and the guard ground electrode comprises at least one slot that reduces strain accumulated across a width of the at least one of the ground electrode and the guard ground electrode.

22. The modulator of claim 18 wherein the RF electrode is asymmetrically positioned on the electro-optic substrate between the first and the second waveguide.

23. The modulator of claim 18 wherein the modulator is a chirped modulator.

24. The modulator of claim 18 further comprising an in-line bias electrode modulator section that has a thermal sensitivity that is opposite to a thermal sensitivity of the RF electrode.

25. The modulator of claim 18 wherein a buffer layer is positioned between the electro-optic substrate and at least one of the RF electrode, the ground electrode, and the guard ground electrode.

26. A co-planar waveguide interferometric electro-optic modulator comprising;
   a) a first and second waveguide that are formed in an electro-optic substrate;
   b) a RF electrode that is positioned on the electro-optic substrate between the first and the second waveguide;
   c) a ground electrode that is positioned on the electro-optic substrate proximate to the second waveguide, the ground electrode generating a thermal stress in the second waveguide; and
   d) a dielectric material that generates a thermal stress in the first waveguide that substantially matches the thermal stress generated in the second waveguide, thereby reducing a net phase shift and a resulting bias point sensitivity of the modulator to both ambient temperature and an applied RF field, the dielectric material being positioned on the electro-optic substrate proximate to the first waveguide.

27. The modulator of claim 26 wherein a width of the dielectric material is dimensioned to cause the first waveguide to experience a thermal stress that substantially matches a thermal stress experienced by the second waveguide.

28. The modulator of claim 26 wherein the ground electrode comprises at least one slot that reduces strain accumulated across a width of the electrode.

29. The modulator of claim 26 wherein the RF electrode is asymmetrically positioned on the electro-optic substrate between the first and the second waveguide.

30. The modulator of claim 26 wherein the modulator is a chirped modulator.

31. The modulator of claim 26 wherein a buffer layer is positioned between the electro-optic substrate and at least one of the RF electrode, the ground electrode, and the dielectric material.

32. An asymmetric co-planar waveguide interferometric electro-optic modulator comprising:
   a) a first and second waveguide that are formed in a lithium niobate substrate;
   b) a RF electrode that is asymmetrically positioned on the lithium niobate substrate between the first and the second waveguide;
   c) a ground electrode that is positioned on the electro-optic substrate proximate to the second waveguide;
   d) an in-line bias electrode modulator section that is positioned on the electro-optic substrate and has a thermal sensitivity that is opposite to a thermal sensitivity of the RF electrode; and
   e) a guard ground electrode that is dimensioned to sink heat from the RF electrode, the guard ground electrode generating a thermal stress in the first waveguide, thereby reducing a net phase shift and a resulting bias point sensitivity of the modulator to both ambient temperature and an applied RF field, the guard ground electrode being positioned on the electro-optic substrate proximate to the first waveguide.

33. The modulator of claim 32 wherein at least one of the ground electrode and the guard ground electrode comprises at least one slot that relieves thermal stress.

34. The modulator of claim 32 wherein the ground electrode has a width that is less than ten times a width of the RF electrode.

35. The modulator of claim 32 further comprising a buffer layer that is formed on the electro-optic substrate and wherein the RF and ground electrodes are formed on the buffer layer.

36. The modulator of claim 32 wherein the modulator is a chirped modulator.

37. The modulator of claim 32 wherein a buffer layer is positioned between the electro-optic substrate and at least one of the RF electrode, the ground electrode, and the guard ground electrode.

38. A co-planar waveguide interferometric electro-optic modulator including a bias electrode modulator section, the bias electrode modulator section comprising:
   a) a first and second waveguide that are formed in an electro-optic substrate;
   b) a bias electrode that is positioned on the electro-optic substrate between the first and the second waveguide;
   c) a first ground electrode that is positioned on the electro-optic substrate proximate to the first waveguide; and
   d) a second ground electrode that is positioned on the electro-optic substrate proximate to the second waveguide,
      wherein the bias electrode modulator section has a thermal sensitivity that is opposite to a thermal sensitivity of an RF electrode of the electro-optic modulator, thereby reducing bias point sensitivity of the electro-optic modulator to ambient temperature.

39. The modulator section of claim 38 wherein at least one of the bias electrode, first electrode, and second electrode are positioned directly on the substrate.

40. The modulator of claim 38 wherein a buffer layer is positioned between the electro-optic substrate and at least one of the bias electrode, the first ground electrode, and the second ground electrode.

* * * * *